US011132768B2

(12) United States Patent
Yasuda

(10) Patent No.: US 11,132,768 B2
(45) Date of Patent: Sep. 28, 2021

(54) METHOD FOR CONTROLLING DISPLAY DEVICE, DISPLAY DEVICE, AND DISPLAY SYSTEM

(71) Applicant: SEIKO EPSON CORPORATION, Tokyo (JP)

(72) Inventor: Yutaka Yasuda, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/744,518

(22) Filed: Jan. 16, 2020

(65) Prior Publication Data
US 2020/0234409 A1 Jul. 23, 2020

(30) Foreign Application Priority Data

Jan. 17, 2019 (JP) .............................. JP2019-005749

(51) Int. Cl.
*G06T 3/00* (2006.01)
*G06T 3/40* (2006.01)
*G09G 5/00* (2006.01)

(52) U.S. Cl.
CPC .......... *G06T 3/4092* (2013.01); *G09G 5/005* (2013.01); *G09G 2340/14* (2013.01); *G09G 2370/16* (2013.01)

(58) Field of Classification Search
None
See application file for complete search history.

(56) References Cited

U.S. PATENT DOCUMENTS

| 2003/0095135 | A1* | 5/2003 | Kaasila | ................. G06T 11/203 345/613 |
| 2008/0129666 | A1* | 6/2008 | Shimotono | ........... G06F 1/1677 345/87 |
| 2010/0073353 | A1* | 3/2010 | Muramatsu | .......... G09G 3/3611 345/213 |
| 2010/0285844 | A1* | 11/2010 | Hosoi | ............... H04M 1/72522 455/566 |

(Continued)

FOREIGN PATENT DOCUMENTS

| JP | 3910526 B2 | 4/2007 |
| JP | 2012-191463 A | 10/2012 |

(Continued)

*Primary Examiner* — Martin Mushambo
(74) *Attorney, Agent, or Firm* — Oliff PLC

(57) ABSTRACT

A method for controlling a display device displaying a horizontally oriented image or a vertically oriented image includes: determining whether the display device is in a state of displaying the horizontally oriented image or in a state of displaying the vertically oriented image; transmitting first resolution information representing a first resolution to a terminal device when it is determined that the display device is in the state of displaying the horizontally oriented image, and transmitting second resolution information representing a second resolution higher than the first resolution to the terminal device when it is determined that the display device is in the state of displaying the vertically oriented image; receiving image information with a resolution based on the first resolution information or the second resolution information from the terminal device; and displaying the image based on the image information.

14 Claims, 7 Drawing Sheets

| PANEL RESOLUTION (HORIZONTAL × VERTICAL) | FIRST RESOLUTION: IN HORIZONTAL DISPLAY | | SECOND RESOLUTION: IN VERTICAL DISPLAY | | |
|---|---|---|---|---|---|
| | VERTICAL RESOLUTION (a) | HORIZONTAL RESOLUTION (b) | VERTICAL RESOLUTION (b) | HORIZONTAL RESOLUTION ($b^2/a$) | NOTIFIED RESOLUTION (HORIZONTAL × VERTICAL) |
| SVGA (800 × 600) | 600 | 800 | 800 | 1066 | 1280 × 800<br>1280 × 720 |
| XGA (1024 × 768) | 768 | 1024 | 1024 | 1365 | 1440 × 1050<br>1920 × 1080 |
| WXGA (1280 × 800) | 800 | 1280 | 1280 | 2048 | 1920 × 1200<br>1920 × 1080 |
| 1080p (1920 × 1080) | 1080 | 1920 | 1920 | 3413 | 3840 × 2160 |

(56) References Cited

U.S. PATENT DOCUMENTS

| | | | |
|---|---|---|---|
| 2012/0154386 A1* | 6/2012 | Nagara | G06F 3/147 345/419 |
| 2012/0188448 A1* | 7/2012 | Kimura | G09G 5/006 348/521 |
| 2014/0306919 A1* | 10/2014 | Tanaka | G06F 1/1626 345/173 |
| 2015/0161767 A1 | 6/2015 | Monden | |
| 2015/0248870 A1 | 9/2015 | Nagano et al. | |
| 2018/0098018 A1* | 4/2018 | Cho | H04N 5/44591 |

FOREIGN PATENT DOCUMENTS

| | | |
|---|---|---|
| JP | 2013-120472 A | 6/2013 |
| JP | 2014-071164 A | 4/2014 |
| JP | 2014-102795 A | 6/2014 |
| JP | 2015-114436 A | 6/2015 |

* cited by examiner

FIG. 6

| PANEL RESOLUTION (HORIZONTAL × VERTICAL) | FIRST RESOLUTION: IN HORIZONTAL DISPLAY | | SECOND RESOLUTION: IN VERTICAL DISPLAY | | |
|---|---|---|---|---|---|
| | VERTICAL RESOLUTION (a) | HORIZONTAL RESOLUTION (b) | VERTICAL RESOLUTION (b) | HORIZONTAL RESOLUTION ($b^2/a$) | NOTIFIED RESOLUTION (HORIZONTAL × VERTICAL) |
| SVGA (800 × 600) | 600 | 800 | 800 | 1066 | 1280 × 800 / 1280 × 720 |
| XGA (1024 × 768) | 768 | 1024 | 1024 | 1365 | 1440 × 1050 / 1920 × 1080 |
| WXGA (1280 × 800) | 800 | 1280 | 1280 | 2048 | 1920 × 1200 / 1920 × 1080 |
| 1080p (1920 × 1080) | 1080 | 1920 | 1920 | 3413 | 3840 × 2160 |

METHOD FOR CONTROLLING DISPLAY DEVICE, DISPLAY DEVICE, AND DISPLAY SYSTEM

The present application is based on, and claims priority from JP Application Serial Number 2019-005749, filed Jan. 17, 2019, the disclosure of which is hereby incorporated by reference herein in its entirety.

BACKGROUND

1. Technical Field

The present disclosure relates to a method for controlling a display device, a display device, and a display system.

2. Related Art

A display device displaying an image based on image information from a terminal device such as a smartphone is known. For example, a tablet terminal described in JP-A-2013-120472 acquires, from a smartphone, information of an image displayed on the screen of the smartphone and displays the image.

Generally, a display device such as a projector requests image information with a resolution of a horizontally oriented image where the number of pixels in the horizontal direction is greater than the number of pixels in the vertical direction, from a terminal device. According to the related art, the resolution of the image information is fixed regardless of whether the image displayed by the display device is vertically oriented or horizontally oriented. Therefore, when displaying a vertically oriented image by changing the installation attitude or the like, the display device according to the related art trims a part of an image from the terminal device and displays the resulting image in an enlarged form. However, this poses a problem in that image quality drops, compared with when displaying a vertically oriented image.

SUMMARY

A method for controlling a display device according to an aspect of the present disclosure is a method for controlling a display device displaying a horizontally oriented image or a vertically oriented image. The method includes: determining whether the display device is in a state of displaying the horizontally oriented image or in a state of displaying the vertically oriented image; transmitting first resolution information representing a first resolution to a terminal device when it is determined that the display device is in the state of displaying the horizontally oriented image, and transmitting second resolution information representing a second resolution higher than the first resolution to the terminal device when it is determined that the display device is in the state of displaying the vertically oriented image; receiving image information with a resolution based on the first resolution information or the second resolution information from the terminal device; and displaying the image based on the image information.

A display device according to another aspect of the present disclosure includes: a display unit displaying a horizontally oriented image or a vertically oriented image based on image information; a storage unit storing first resolution information representing a first resolution and second resolution information representing a second resolution higher than the first resolution; a determination unit determining whether the display unit is in a state of displaying the horizontally oriented image or in a state of displaying the vertically oriented image; and an interface circuit transmitting the first resolution information to a terminal device when it is determined that the display unit is in the state of displaying the horizontally oriented image, transmitting the second resolution information to the terminal device when it is determined that the display unit is in the state of displaying the vertically oriented image, and receiving the image information with a resolution based on the first resolution information or the second resolution information from the terminal device.

A display system according to still another aspect of the present disclosure includes: a display unit displaying a horizontally oriented image or a vertically oriented image based on image information; a storage unit storing first resolution information representing a first resolution and second resolution information representing a second resolution higher than the first resolution; a determination unit determining whether the display unit is in a state of displaying the horizontally oriented image or in a state of displaying the vertically oriented image; and an interface circuit transmitting the first resolution information to a terminal device when it is determined that the display unit is in the state of displaying the horizontally oriented image, transmitting the second resolution information to the terminal device when it is determined that the display unit is in the state of displaying the vertically oriented image, and receiving the image information with a resolution based on the first resolution information or the second resolution information from the terminal device.

BRIEF DESCRIPTION OF THE DRAWINGS

FIG. 6 is a table showing an example of the first resolution and the second resolution.

DESCRIPTION OF EXEMPLARY EMBODIMENTS

Figure 1:
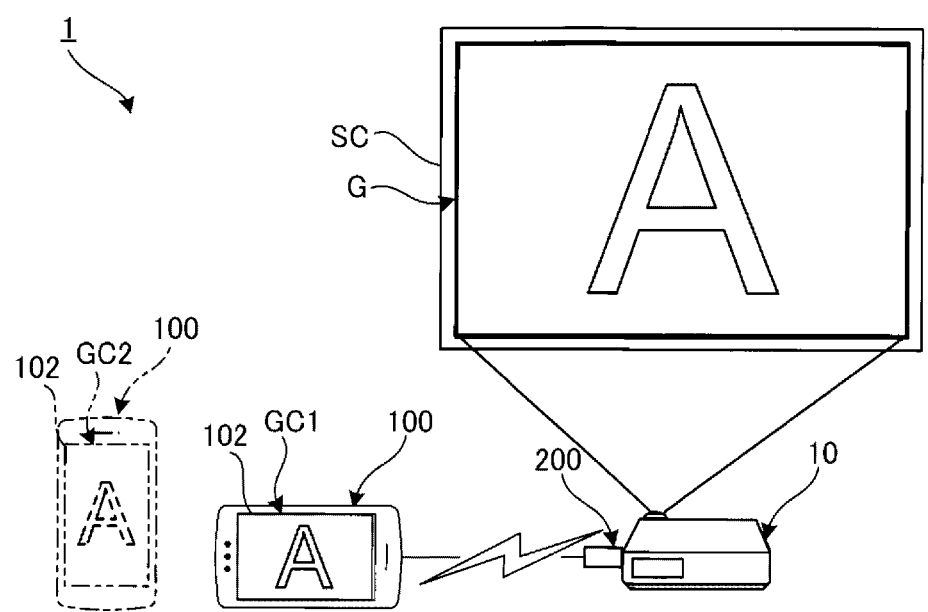
FIG. 1 schematically shows an external appearance of a display system according to a first embodiment.

Preferred embodiments of the present disclosure will now be described with reference to the accompanying drawings. In the drawings, the dimensions and scale of each part differ from the actual dimensions and scale according to need, and some parts are schematically shown in order to facilitate understanding. The scope of the present disclosure is not limited to these embodiments unless there is any particular statement to limit the present disclosure in the following description.

1. First Embodiment

1-1. Outline of Display System

FIG. 1 schematically shows an external appearance of a display system 1 according to a first embodiment. The display system 1 is a projection system. As shown in FIG. 1, the display system 1 has a display device 10, a terminal device 100, and a transmission device 200.

The display device 10 is communicatively coupled to the terminal device 100 via the transmission device 200. The display device 10 is a projector projecting and displaying an image G based on image information from the terminal device 100 or the like, onto a screen SC. As an installation site for the screen SC, for example, a wall, floor, table, or the like can be employed. As an installation site for the display device 10, for example, a ceiling, wall, floor, table, dedicated installation stand, or the like can be employed.

The display device 10 displays the image G, which is horizontally oriented or vertically oriented. FIG. 1 illustrates the case where the image G is horizontally oriented. In this embodiment, changing the installation attitude of the display device 10 switches the image G between a horizontally oriented state and a vertically oriented state. That is, when the display device 10 is installed in a horizontal position as shown in FIG. 1, the image G that is horizontally oriented as viewed from the user is displayed. Meanwhile, when the display device 10 is rotated 90 degrees about an axis along the direction of projection from the state shown in FIG. 1 and is installed in a vertical position, the image G that is vertically oriented as viewed from the user is displayed.

The image G is displayed in a part or the entirety of an available display area of the display device 10. The image G is an image based on image information from the terminal device 100. The image information is information about an image GC1 or GC2 displayed at the terminal device 100. The example shown in FIG. 1 illustrates the case where the image information is information about the image GC1. The terminal device 100 shown in FIG. 1 is a smartphone having a display unit 102 displaying the image GC1 or GC2. The image GC1 is a horizontally oriented image displayed when the terminal device 100 is arranged in the horizontal position, as shown by a solid line in FIG. 1. The image GC2 is a vertically oriented image displayed when the terminal device 100 is arranged in the vertical position, as shown by a chain double-dashed line in FIG. 1. The terminal device 100 is not limited to the example shown in FIG. 1 and may be, for example, a tablet terminal, laptop personal computer, or the like.

The transmission device 200 is a device receiving image information from the terminal device 100 and transmitting the image information to the display device 10. In this embodiment, the transmission device 200 is an example of a wireless device wirelessly connected to the terminal device 100. The transmission device 200 is coupled to the display device 10 via a wire. As a transmission technique used by the transmission device 200, for example, the Miracast technology or the like can be employed. As the transmission device 200, for example, an off-the-shelf device such as "Chromecast" or "Fire TV Stick". "Miracast", "Chromecast", and "Fire TV Stick" are registered trademarks. The transmission device 200 may be unified with the display device 10 or may be formed by a part of the display device 10, as in a third embodiment described later. In this case, the configuration for communication between the transmission device 200 and the display device 10 may be changed according to need.

The display device 10 requests image information from the terminal device 100 via the transmission device 200. The resolution of the image information is the screen resolution expressed by the numbers of pixels in the horizontal and vertical directions. The number of pixels in the horizontal direction is also referred to as "horizontal resolution". The number of pixels in the vertical direction is also referred to as "vertical resolution". Here, the horizontal resolution of the image information is higher than the vertical resolution of the image information. On receiving the request for image information, the terminal device 100 generates image information about the image GC1 or GC2 displayed at the terminal device 100, with a designated resolution, and transmits the resulting image information to the transmission device 200. When displaying the vertically oriented image GC2, the terminal device 100 adds a blank image to the left and right of the image GC2 and thus generates image information with a designated resolution.

When the display device 10 displays the horizontally oriented image G, the resolution of the image information requested by the display device 10 from the terminal device 100 is a first resolution. When the display device 10 displays the vertically oriented image G, the resolution of the image information requested by the display device 10 from the terminal device 100 is a second resolution higher than the first resolution. That is, the product of the number of pixels in the vertical direction and the number of pixels in the horizontal direction represented by the second resolution is greater than the product of the number of pixels in the vertical direction and the number of pixels in the horizontal direction represented by the first resolution. Therefore, even when the display device 10 trims a part of the image from the terminal device 100 and displays the resulting image in an enlarged form in order to display the vertically oriented image G, a drop in image quality from when displaying the horizontally oriented image G can be reduced. Here, with each of the first resolution and the second resolution, the number of pixels in the horizontal direction is greater than the number of pixels in the vertical direction. Therefore, for example, when the transmission device 200 only supports a display device with a horizontally oriented screen, a vertically oriented image can be displayed without lowering the resolution.

1-2. Configuration of Display System

Figure 2:
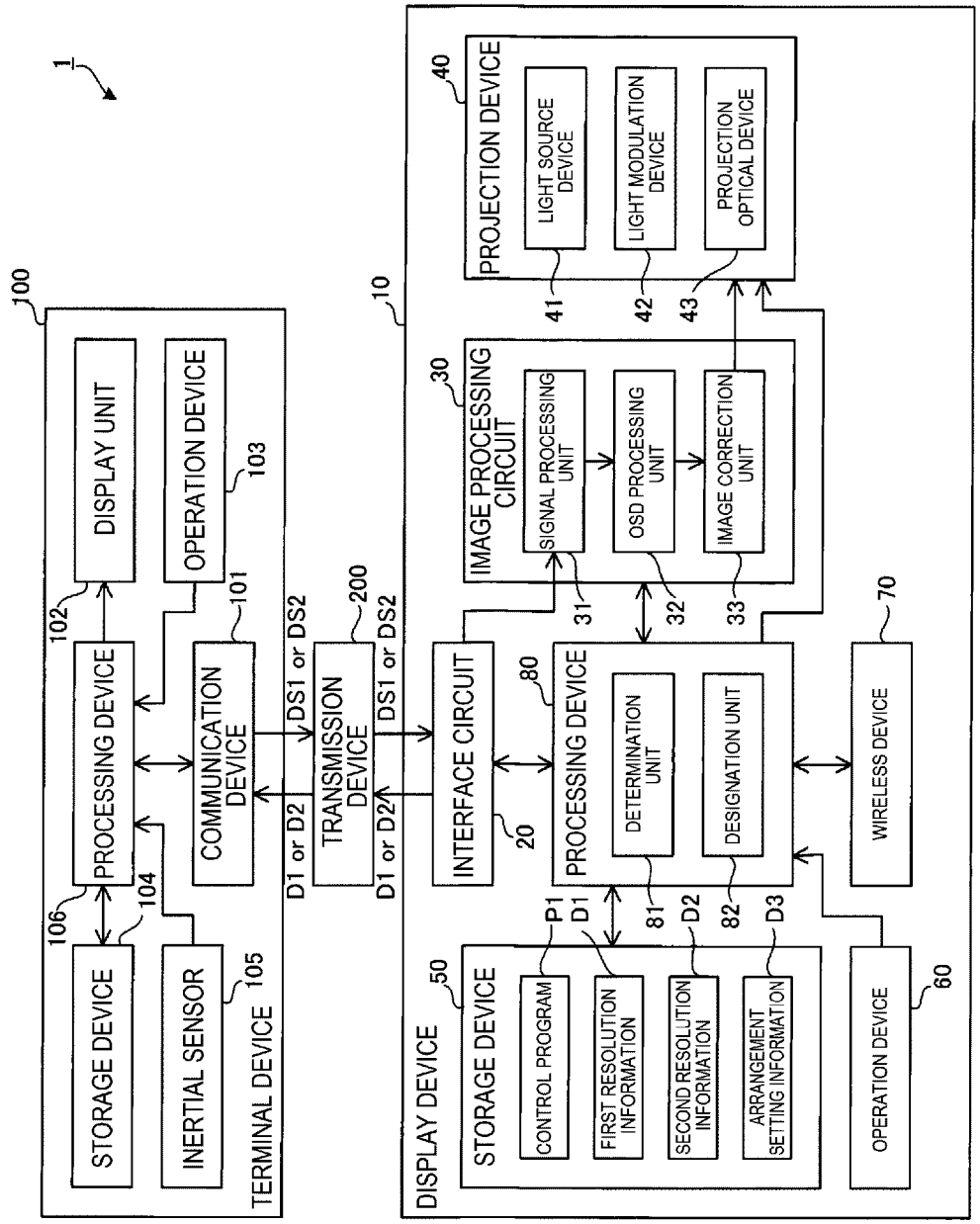
FIG. 2 shows the configuration of the display system according to the first embodiment.

FIG. 2 shows the configuration of the display system 1 according to the first embodiment. As shown in FIG. 2, the display device 10 has an interface circuit 20, an image processing circuit 30, a projection device 40, a storage device 50, an operation device 60, a wireless device 70, and a processing device 80. These are communicatively coupled to each other. The projection device 40 is an example of a display unit.

The interface circuit 20 is an interface communicatively coupled to the terminal device 100 via the transmission device 200. For example, the interface circuit 20 is an interface such as a Universal Serial Bus (USB) or high-definition multimedia interface (HDMI). "USB" and "HDMI" are registered trademarks. For example, when the transmission device 200 is an off-the-shelf device using the Miracast technology or the like, the transmission device 200 is wire-coupled to the interface circuit 20 by the HDMI. In this case, the terminal device 100 is wirelessly connected to the transmission device 200, for example, via Wi-Fi. "Wi-Fi" is a registered trademark.

The interface circuit 20 has the function of transmitting various kinds of information to the terminal device 100 via the transmission device 200 and the function of receiving various kinds of information from the terminal device 100 via the transmission device 200. Specifically, the interface circuit 20 transmits various kinds of information including first resolution information D1 or second resolution information D2 to the transmission device 200. The first resolution information D1 is information about a first resolution. The second resolution information D2 is information about a second resolution higher than the first resolution. The interface circuit 20 also receives various kinds of information including image information DS1 or DS2 from the terminal device 100. The image information DS1 is image information with the first resolution. The image information DS2 is image information with the second resolution.

The image processing circuit 30 is a circuit performing necessary processing of the image information DS1 or DS2 from the interface circuit 20 and inputting the resulting image information to the projection device 40. The image processing circuit 30 has, for example, a frame memory, not illustrated. The image processing circuit 30 loads the image information DS1 or DS2 into the frame memory, executes various kinds of processing such as resolution conversion processing, resizing processing, and distortion correction processing according to need, and inputs the resulting image information to the projection device 40. The image processing circuit 30 in this embodiment has a signal processing unit 31, an on-screen display (OSD) processing unit 32, and an image correction unit 33. The signal processing unit 31 execute trimming and scaling of the image information DS1 or DS2 according to need. The OSD processing unit 32 generates image information to show a menu or to show an operation guide or the like and combines the generated image information with the image information DS1 or DS2 according to need. The image correction unit 33 executes geometric correction to adjust the image information DS1 or DS2 to the shape of the display area of the image G.

The projection device 40 is a device projecting image light and displaying the horizontally oriented or vertically oriented image G onto the screen SC. The projection device 40 has a light source device 41, a light modulation device 42, and a projection optical device 43.

The light source device 41 includes, for example, a light source such as a halogen lamp, xenon lamp, ultra-high-pressure mercury lamp, light-emitting diode (LED), or laser light source. The light source device 41 emits, for example, each of red light, green light, and blue light, or emits white light. When the light source device 41 emits white light, the light emitted from the light source device 41 is reduced in unevenness of luminance distribution by an optical integration system, not illustrated, and is subsequently split into red light, green light, and blue light by a color separation system, not illustrated, and becomes incident on the light modulation device 42. The light modulation device 42 includes three light modulation elements corresponding to the red light, the green light, and the blue light. Each of the three light modulation elements includes, for example, a transmission-type liquid crystal panel, reflection-type panel, digital mirror device (DMD), or the like. The three light modulation elements modulate the red light, the green light, and the blue light, and thus generate image lights of the respective colors. The image lights of the respective colors generated by the light modulation device 42 are combined together into full-color image light by a light combining system, not illustrated. The projection optical device 43 includes a projection system projecting the full-color image light to form an image on the screen SC. The projection system is an optical system including at least one projection lens and may include a zoom lens, focus lens, or the like.

The storage device 50 is a storage device storing a control program P1 executed by the processing device 80, and data such as the first resolution information D1, the second resolution information D2, and arrangement setting information D3 processed by the processing device 80. The arrangement setting information D3 is information about the installation attitude of the display device 10. For example, the arrangement setting information D3 includes information representing whether the display device 10 is arranged in the horizontal position or the vertical position. The storage device 50 includes, for example, a hard disk drive or semiconductor memory. A part of the entirety of the storage device 50 may be provided in a storage device outside the display device 10, or in a server or the like.

The operation device 60 is a device accepting an operation from the user. For example, the operation device 60 includes an operation panel and a remote control light receiving unit, not illustrated. The operation panel is provided at an outer casing of the display device 10 and outputs a signal based on an operation by the user. The remote control light receiving unit receives an infrared signal from a remote controller, not illustrated, then decodes the infrared signal, and outputs a signal based on an operation on the remote controller.

The wireless device 70 is a communication device wirelessly connected to an external device. For example, the wireless device 70 is a communication device for a wireless local area network (LAN) including low-power wide-area (LPWA) or Wi-Fi, or a Bluetooth communication device or the like. "Bluetooth" is a registered trademark.

The processing device 80 is a processing device having the function of controlling respective parts of the display device 10 and the function of processing various data. The processing device 80 includes, for example, a processor such as a central processing unit (CPU). The processing device 80 executes the control program P1 stored in the storage device 50 and thus implements various functions including functional units described later. The processing device 80 may be formed of a single processor or a plurality of processors. A part or all of the functions of the processing device 80 may be implemented by hardware such as a digital signal processor (DSP), application-specific integrated circuit (ASIC), programmable logic device (PLD), or field-programmable gate array (FPGA). The processing device 80 may be unified with the image processing circuit 30.

The processing device 80 has a determination unit 81 and a designation unit 82 as functional units. The determination unit 81 determines whether the image G displayed by the projection device 40 is horizontally oriented or vertically oriented. In this embodiment, the determination unit 81 carries out this determination, based on the arrangement setting information D3 stored in the storage device 50. The designation unit 82 designates the first resolution or the second resolution as the resolution of the image information to be requested to the terminal device 100, based on the result of the determination by the determination unit 81. The designation unit 82 causes the interface circuit 20 to transmit the first resolution information D1 or the second resolution information D2.

Meanwhile, the terminal device 100 has a communication device 101, a display unit 102, an operation device 103, a storage device 104, an inertial sensor 105, and a processing device 106. These are communicatively coupled to each other.

The communication device 101 is a communication device communicatively coupled to the interface circuit 20 via the transmission device 200. For example, the communication device 101 is a communication device for a wireless LAN including Wi-Fi or for Bluetooth or the like. The communication device 101 receives various kinds of information including the first resolution information D1 or the second resolution information D2. The communication device 101 also transmits various kinds of information including the image information DS1 or DS2.

The display unit 102 displays various images under the control of the processing device 106. The display unit 102 is, for example, a display device including a display panel of various kinds such as a liquid crystal display panel or organic electro-luminescence (EL) display panel.

The operation device 103 is an input device accepting an operation from the user. For example, the operation device 103 includes a pointing device such as a touch pad, touch panel, or mouse. When the operation device 103 includes a touch panel, the operation device 103 may also function as the display unit 102.

The storage device 104 is a storage device storing programs such as an operating system and an application program or the like executed by the processing device 106 and data processed by the processing device 106. The storage device 104 includes, for example, a hard disk drive or semiconductor memory. The storage device 104 may be provided in a storage device outside the terminal device 100 or in a server or the like.

The inertial sensor 105 is a sensor detecting one or both of an acceleration and an angular velocity applied to the terminal device 100. For example, the inertial sensor 105 includes one or both of an acceleration sensor and an angular velocity sensor.

The processing device 106 is a processing device having the function of controlling respective parts of the terminal device 100 and the function of processing various data. The processing device 106 includes, for example, a processor such as a CPU (central processing unit). The processing device 106 executes the programs stored in the storage device 104 and thus implements various functions. The processing device 106 may be formed of a single processor or a plurality of processors. A part or all of the functions of the processing device 106 may be implemented by hardware such as a digital signal processor (DSP), application-specific integrated circuit (ASIC), programmable logic device (PLD), or field-programmable gate array (FPGA).

The processing device 106 determines whether the terminal device 100 is arranged in the horizontal position or the vertical position, based on the result of detection by the inertial sensor 105. When the terminal device 100 is arranged in the horizontal position, the processing device 106 causes the display unit 102 to display the horizontally oriented image GC1. Meanwhile, when the terminal device 100 is arranged in the vertical position, the processing device 106 causes the display unit 102 to display the vertically oriented image GC2. In this way, the terminal device 100 displays the image GC1 or GC2. In contrast, the display device 10 displays the image G in the following manner.

Figure 3:
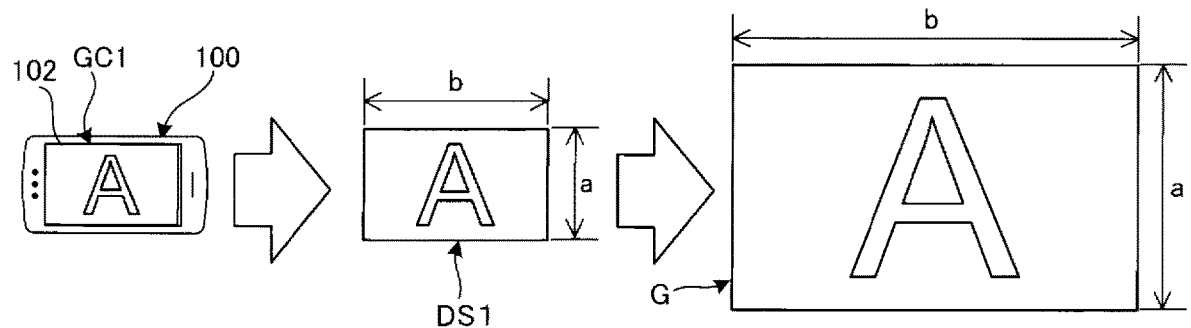
FIG. 3 illustrates the case where a display device displays a horizontally oriented image using image information with a first resolution from a terminal device.

FIG. 3 illustrates the case where the display device 10 displays the horizontally oriented image G, using the image information DS1 with the first resolution from the terminal device 100. As shown in FIG. 3, when displaying the horizontally oriented image G, the display device 10 receives the image information DS1 with the first resolution from the terminal device 100 and displays the image G based on the image information DS1. The first resolution is a pixels in the vertical direction by b pixels in the horizontal direction. The example shown in FIG. 3 illustrates the case where the terminal device 100 displays the horizontally oriented image GC1. In this case, when the first resolution is set as a maximum resolution available to the display device 10, the image GC1, which is the display content of the terminal device 100, can be displayed as the image G with the maximum resolution or a similar resolution. Even in the state where the terminal device 100 displays the vertically oriented image GC2, the display device 10, when displaying the horizontally oriented image G, receives the image information DS1 with the first resolution from the terminal device 100 and displays the image G based on the image information DS1. In this case, a blank image is added to the image information DS1, as shown in FIG. 5, described later.

Figure 4:
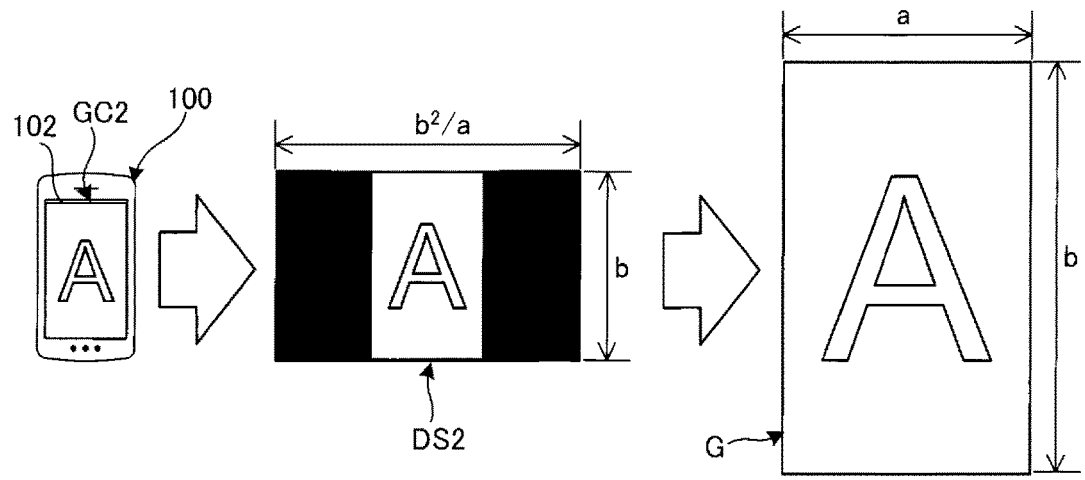
FIG. 4 illustrates the case where the display device displays a vertically oriented image using image information with a second resolution from the terminal device.

FIG. 4 illustrates the case where the display device 10 displays the vertically oriented image G, using the image information DS2 with the second resolution from the terminal device 100. As shown in FIG. 4, when displaying the vertically oriented image G, the display device 10 receives the image information DS2 with the second resolution from the terminal device 100 and displays the image G based on the image information DS2. The second resolution is b pixels in the vertical direction by ($b^2$/a) pixels in the horizontal direction. The example shown in FIG. 4 illustrates the case where the terminal device 100 displays the vertically oriented image GC2. In this case, a blank image is added to the left and right of the display content of the terminal device 100, as indicated by black zones in FIG. 4. The display device 10 trims away the blank images of the image based on the image information DS2 and displays a part corresponding to the image GC2, which is the display content of the terminal device 100, in an enlarged form. As a and b are set based on the maximum resolution available to the display device 10, as described above, the image GC2 can be displayed as the image G with the maximum resolution or a similar resolution. Also, though not illustrated, even in the state where terminal device 100 displays the horizontally oriented image GC1, the display device 10, when displaying the vertically oriented image G, receives the image information DS2 with the second resolution from the terminal device 100 and displays the image G based on the image information DS2. In this case, no blank image is added to the image information DS2. In this case, the display device 10 may receive the image information DS1 with the first resolution from the terminal device 100 and display the image G based on the image information DS1.

Figure 5:
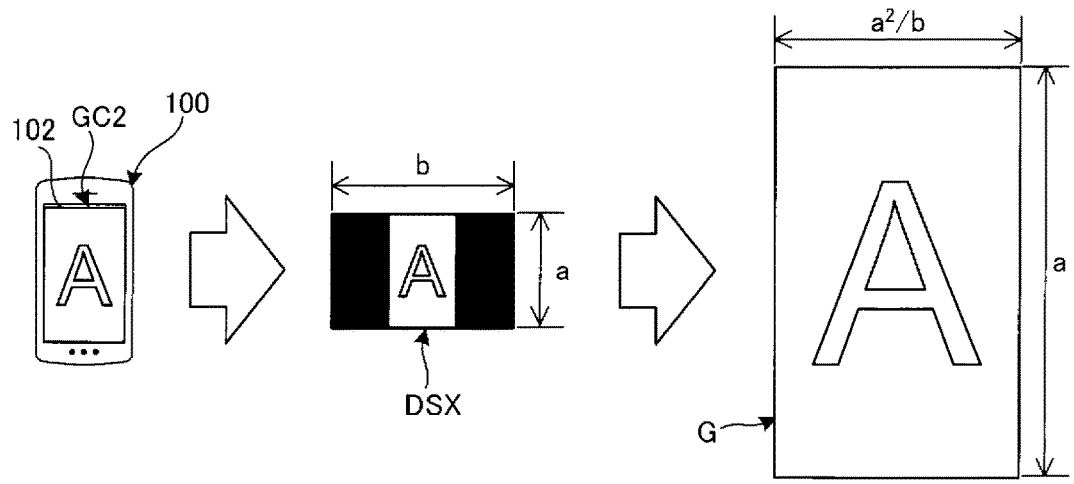
FIG. 5 explains a drop in image quality in the case where the display device displays a vertically oriented image using the image information with the first resolution.

FIG. 5 explains a drop in image quality in the case where the display device 10 displays the vertically oriented image G, using the image information DS1 with the first resolution. As shown in FIG. 5, it is assumed that the display device 10 displays the vertically oriented image G, using the image information DS1 with the first resolution. In this case, when the display device 10 trims the image based on the image information DS2 and displays a part corresponding to the image GC2, which is the display content of the terminal device 100, in an enlarged form, the resolution of this part is a pixels in the vertical direction×($a^2$/b) pixels in the horizontal direction. Therefore, the resolution is lower than the maximum resolution (b×a) available to the display device 10 when the image G is vertically oriented.

FIG. 6 is a table showing an example of the first resolution and the second resolution. In FIG. 6, a "panel resolution" represents a resolution or maximum resolution available to the display device 10. In FIG. 6, a "notified resolution" is a resolution designated by the display device 10 as the second resolution for the terminal device 100 via the transmission device 200. The "notified resolution" is a resolution that is the closest to a resolution expressed by b pixels in the vertical direction×($b^2$/a) pixels in the horizontal direction, of resolutions available to a general video device. As a resolution available to the general video device is used as the notified resolution in this manner, the terminal device 100 and the transmission device 200 can easily handle image information DS2 with the second resolution even when each of these devices is an off-the-shelf device. The display device 10 may notify one or a plurality of first resolutions or second resolutions to the terminal device 100 or the transmission device 200. When a plurality of resolutions are notified, a resolution available to the display device 10 is selected.

1-3. Operation of Display System

Figure 7:
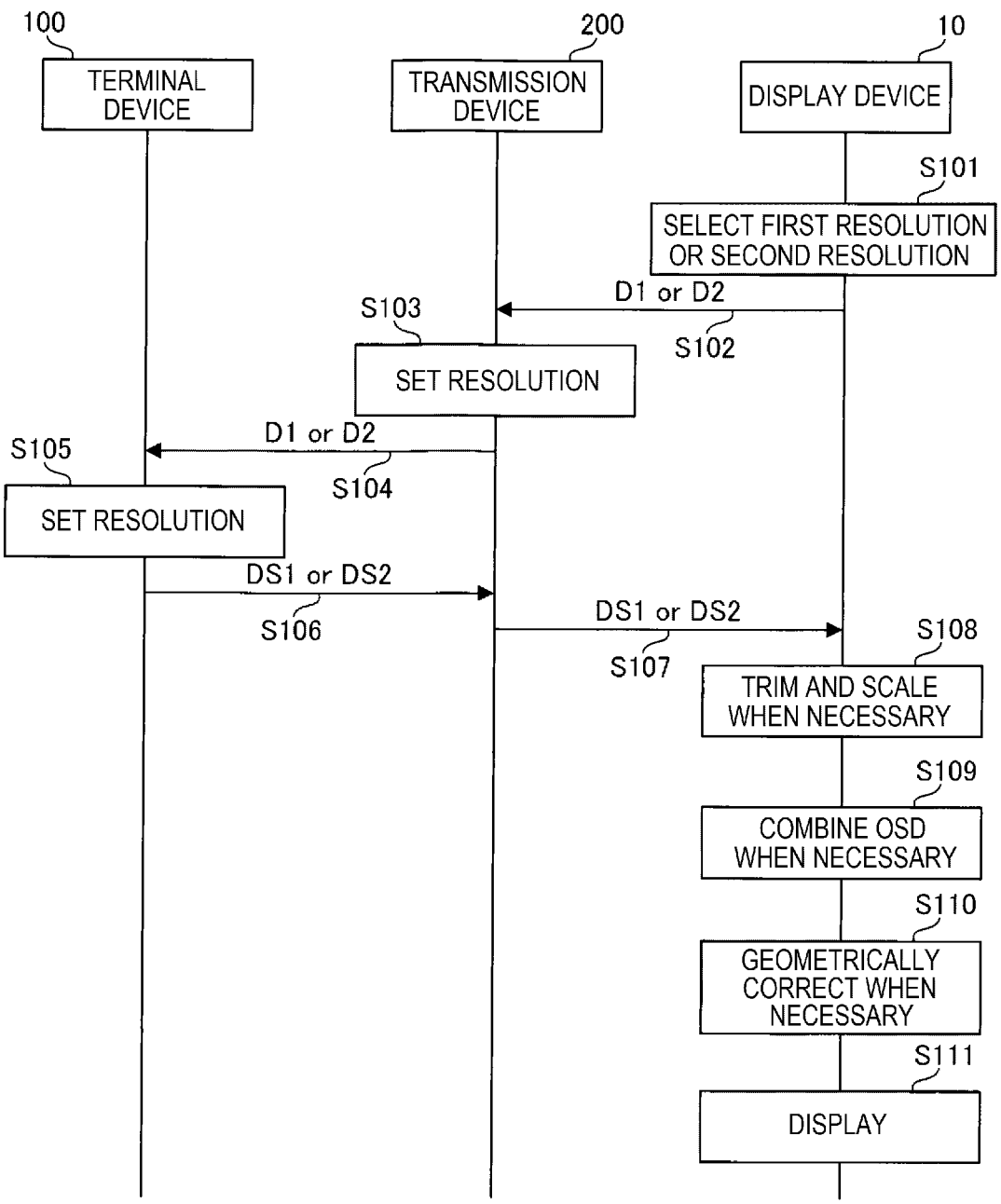
FIG. 7 shows the operation of the display system according to the first embodiment.

FIG. 7 shows the operation of the display system 1 according to the first embodiment. In the display system 1, as shown in FIG. 7, first in step S101, the designation unit 82 of the display device 10 selects one of the first resolution and the second resolution, based on the result of determination by the determination unit 81. Then, in step S102, the designation unit 82 transmits the first resolution information D1 or the second resolution information D2 to the transmission device 200.

The transmission device 200 in step S103 sets the first resolution or the second resolution as the resolution used between the display device 10 and the terminal device 100, based on the first resolution information D1 or the second resolution information D2. When there is a plurality of first resolutions or second resolutions, the transmission device 200 selects one or more resolutions available to the transmission device 200 as the first resolution or the second resolution. Then, in step S104, the transmission device 200 transmits the first resolution information D1 or the second resolution information D2 to the terminal device 100.

The terminal device 100 in step S105 sets the first resolution or the second resolution as the resolution of image information transmitted to the display device 10 via the transmission device 200, based on the first resolution information D1 or the second resolution information D2. When there is a plurality of first resolutions or second resolutions, the terminal device 100 selects one or more resolutions available to the terminal device 100 as the first resolution or the second resolution. Then, in steps S106 and S107, the terminal device 100 transmits the image information DS1 or DS2 to the display device 10 via the transmission device 200.

In the display device 10, in step S108, the signal processing unit 31 executes trimming and scaling of the image information DS1 or DS2 according to need. Next, in step S109, the OSD processing unit 32 generates image information to show a menu or to show an operation guide or the like and combines the resulting image information with the image information DS1 or DS2 according to need. Next, in step S110, the image correction unit 33 executes geometric correction to adjust the image information DS1 or DS2 to the shape of the display area of the image G according to need. Subsequently, in step S111, the projection device 40 displays the image G based on the image information DS1 or DS2.

The display system 1 or the display device 10 includes the projection device 40 as an example of the display unit, the storage device 50 as an example of the storage unit the determination unit 81, and the interface circuit 20, as described above. The projection device 40 displays the horizontally oriented or vertically oriented image G based on image information. The storage device 50 stores the first resolution information D1 representing the first resolution and the second resolution information D2 representing the second resolution higher than the first resolution. The determination unit 81 determines whether the display device 10 or the projection device 40 is in the state of displaying the horizontally oriented image G or in the state of displaying the vertically oriented image G. When it is determined that the display device 10 or the projection device 40 is in the state of displaying the horizontally oriented image G, the interface circuit 20 transmits the first resolution information D1 to the terminal device 100. Meanwhile, when it is determined that the display device 10 or the projection device 40 is in the state of displaying the vertically oriented image G, the interface circuit 20 transmits the second resolution information D2 to the terminal device 100. The interface circuit 20 then receives the image information DS1 or DS2 with the resolution based on the first resolution information D1 or the second resolution information D2 from the terminal device 100.

A method for controlling the display device 10 includes: determining whether the display device 10 is in the state of displaying the horizontally oriented image G or in the state of displaying the vertically oriented image G; transmitting the first resolution information D1 or the second resolution information D2 to the terminal device 100, based on the result of the determination; receiving the image information DS1 or DS2 from the terminal device 100; and displaying the image G based on the image information DS1 or DS2.

According to the method for controlling the display device 10, the display device 10, and the display system 1, when the display device 10 is in the state of displaying the horizontally oriented image G, the display device 10 transmits the first resolution information D1 to the terminal device 100, and receives the image information DS1 with the first resolution based on the first resolution information D1 from the terminal device 100. Therefore, as the display device 10 requests image information in which the horizontal resolution is higher than the vertical resolution from the terminal device 100, the display device 10 can display the display content of the terminal device 100 with the first resolution.

Meanwhile, when the display device 10 is in the state of displaying the vertically oriented image G, the display device 10 transmits the second resolution information D2 to the terminal device 100, and receives the image information DS2 with the second resolution based on the second resolution information D2 from the terminal device 100. Therefore, even when the display device 10 requests image information in which the horizontal resolution is higher than the vertical resolution from the terminal device 100 and displays a part of an image based on the image information in an enlarged form, the display device 10 can display the display content of the terminal device 100 with a resolution that is less different from the first resolution.

In this embodiment, the interface circuit 20 receives the image information DS1 or DS2 from the terminal device 100 via the transmission device 200, which is an example of the wireless device. Therefore, the terminal device 100 and the display device 10 can be connected together more easily than when the display device 10 is coupled via a wire to the terminal device 100. Also, the use of an off-the-shelf device as the transmission device 200 is advantageous in that the manufacturing cost of the display device 10 can be reduced.

The display device 10 also has the image processing circuit 30 trimming and enlarging the image information DS2 when it is determined that the display device 10 or the projection device 40 is in the state of displaying the vertically oriented image G. Therefore, even when the terminal device 100 displays the vertically oriented image GC2, the display content of the terminal device 100 can be displayed over the entire display area of the display device 10.

The determination unit 81 determines whether the display device 10 or the projection device 40 is in the state of displaying the horizontally oriented image G or in the state of displaying the vertically oriented image G, based on the arrangement setting information D3, which is setting information about the arrangement of the display device 10. Therefore, when a setting operation is already done, whether the displayed image G is horizontally oriented or vertically oriented can be determined without the user having to perform a separate operation.

2. Second Embodiment

A second embodiment will now be described. This embodiment is similar to the first embodiment except that the method of determining whether the image G is horizontally oriented or vertically oriented is different. In the description below, the second embodiment is described mainly in terms of its difference from the first embodiment and the description of similar matters is omitted. In the drawing used for the description of the second embodiment, components similar to those in the first embodiment are denoted by the same reference signs.

Figure 8:
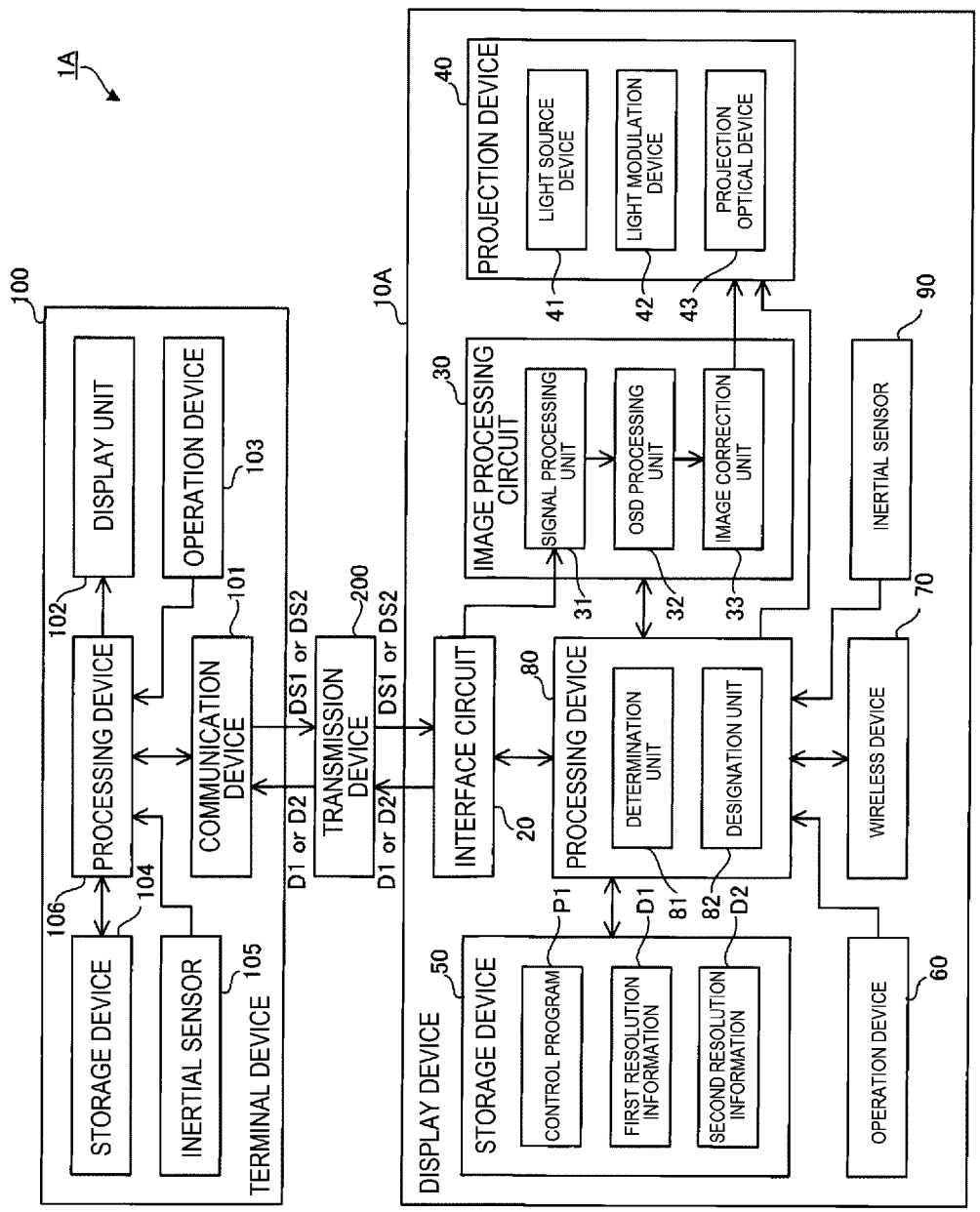
FIG. 8 shows the configuration of a display system according to a second embodiment.

FIG. 8 shows the configuration of a display system 1A according to the second embodiment. As shown in FIG. 8, the display system 1A is similar to the display system 1 in the first embodiment except for having a display device 10A instead of the display device 10 in the first embodiment. The display device 10A is similar to the display device 10 except for having an inertial sensor 90. The inertial sensor 90 includes an acceleration sensor or angular velocity sensor. The inertial sensor 90 outputs a signal that differs depending on whether the display device 10A is arranged in the horizontal position or in the vertical position.

As described above, the display device 10A has the inertial sensor 90 including an acceleration sensor or angular velocity sensor. The determination unit 81 determines whether the display device 10A or the projection unit 40 is in the state of displaying the horizontally oriented image G or in the state of displaying the vertically oriented image G, based on the result of detection by the inertial sensor 90. Therefore, in addition to effects similar those of the first embodiment, the display device 10A has an advantage in that whether the displayed image G is horizontally oriented or vertically oriented can be determined without the user having to carry out a setting operation.

3. Third Embodiment

A third embodiment will now be described. This embodiment is similar to the first embodiment except that the display device and the terminal device are directly coupled together. In the description below, the third embodiment is described mainly in terms of its difference from the first embodiment and the description of similar matters is omitted. In the drawing used for the description of the third embodiment, components similar to those in the first embodiment are denoted by the same reference signs.

Figure 9:
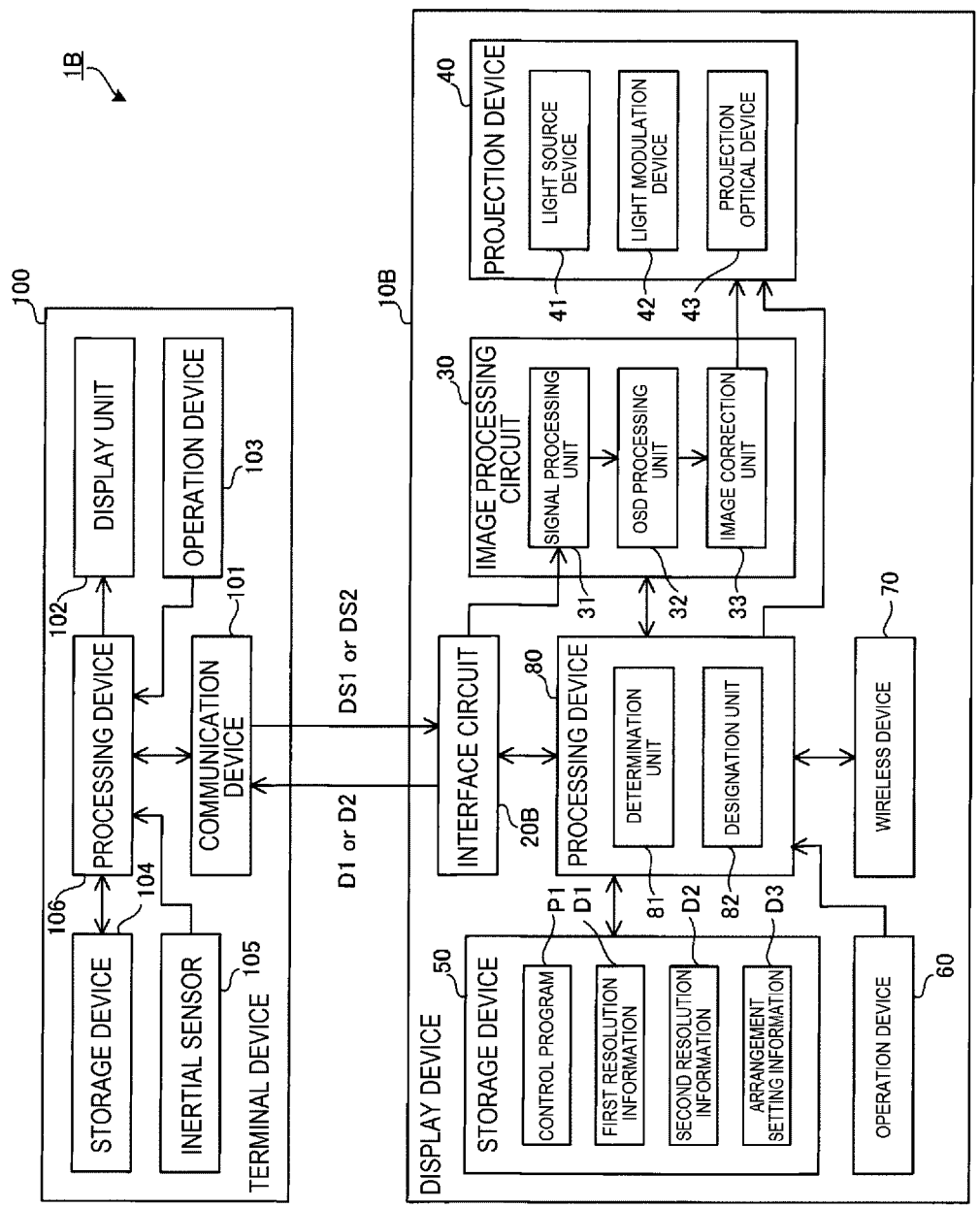
FIG. 9 shows the configuration of a display system according to a third embodiment.

FIG. 9 shows the configuration of a display system 1B according to the third embodiment. As shown in FIG. 9, the display system 1B is similar to the display system 1 in the first embodiment except for omitting the transmission device 200 in the first embodiment and having a display device 10B instead of the display device 10 in the first embodiment. The display device 10B is similar to the display device 10 except for having an interface circuit 20B instead of the interface circuit 20 in the first embodiment.

The interface circuit 20B has the function of communicating with the terminal device 100 in addition to the functions of the interface circuit 20. That is, the interface circuit 20B has the functions of both the interface circuit 20 and the transmission device 200 in the first embodiment. The third embodiment has effects similar to those of the first embodiment.

4. Modification Examples

The method for controlling the display device, the display device, and the display system according to the present disclosure have been described, based on the illustrated embodiments. However, the present disclosure is not limited to these embodiments. The configuration of each part of the present disclosure can be replaced with an arbitrary configuration that achieves a function similar to the embodiments, and an arbitrary configuration can be added thereto. Also, arbitrary configurations in the embodiments may be combined together.

In the embodiments, a configuration in which whether the display device is in the state of displaying a horizontally oriented image or in the state of displaying a vertically oriented image is determined, based on the installation attitude of the display device or the display unit, is described as an example. However, this configuration is not limiting. For example, when the display device splits a displayed image and it is determined that the resolution of a split display area represents vertical orientation, it may then be determined that the display device is in the state of displaying a vertically oriented image. In this case, for example, an image is displayed in a vertically oriented area set at a part within a horizontally oriented available display area. Also, in this case, when the display device is in the state of not splitting a displayed image, it may then be determined that the display device is in the state of displaying a horizontally oriented image.

In the embodiments, the case where the display unit is a projection device is described as an example. However, the display unit is not limited to this and may be, for example, a display device having a liquid crystal display panel, organic electro-luminescence (EL) panel or the like as a display surface.

What is claimed is:

1. A method for controlling a display device displaying a horizontally oriented image or a vertically oriented image, the method comprising:
   determining whether the display device is in a state of displaying the horizontally oriented image or in a state of displaying the vertically oriented image;
   transmitting first resolution information representing a first resolution to a terminal device when it is determined that the display device is in the state of displaying the horizontally oriented image, and transmitting second resolution information representing a second resolution higher than the first resolution to the terminal device when it is determined that the display device is in the state of displaying the vertically oriented image;
   receiving image information with a resolution based on the first resolution information or the second resolution information from the terminal device; and
   displaying the image based on the image information.

2. The method for controlling a display device according to claim 1, wherein
   the image information is received from the terminal device via a wireless device.

3. The method for controlling a display device according to claim 1, wherein
when it is determined that the display device is in the state of displaying the vertically oriented image, the image information is trimmed and enlarged.

4. The method for controlling a display device according to claim 1, wherein
whether the display device is in the state of displaying the horizontally oriented image or in the state of displaying the vertically oriented image is determined, based on a result of detection by an acceleration sensor or an angular velocity sensor arranged in the display device.

5. The method for controlling a display device according to claim 1, wherein
whether the display device is in the state of displaying the horizontally oriented image or in the state of displaying the vertically oriented image is determined, based on setting information about an arrangement of the display device.

6. The method for controlling a display device according to claim 1, wherein
when the display device splits a displayed image and it is determined that the resolution of a split display area represents vertical orientation, it is determined that the display device is in the state of displaying the vertically oriented image.

7. The method for controlling a display device according to claim 1, wherein
each of the first resolution and the second resolution has a number of pixels in a horizontal direction greater than a number of pixels in a vertical direction.

8. The method for controlling a display device according to claim 1, wherein the transmitting step comprises:
designating the first resolution information to represent a first resolution of the display device when it is determined that the display device is in the state of displaying the horizontally oriented image;
designating the second resolution information to represent a second resolution of the display device that is higher than the first resolution when it is determined that the display device is in the state of displaying the vertically oriented image; and
transmitting the designated first resolution information and second resolution information from the display device to a terminal device.

9. A display device comprising:
a display unit displaying a horizontally oriented image or a vertically oriented image based on image information;
a storage unit storing first resolution information representing a first resolution and second resolution information representing a second resolution higher than the first resolution;
a determination unit determining whether the display unit is in a state of displaying the horizontally oriented image or in a state of displaying the vertically oriented image; and
an interface circuit transmitting the first resolution information to a terminal device when it is determined that the display unit is in the state of displaying the horizontally oriented image, transmitting the second resolution information to the terminal device when it is determined that the display unit is in the state of displaying the vertically oriented image, and receiving the image information with a resolution based on the first resolution information or the second resolution information from the terminal device.

10. The display device according to claim 9, wherein
the interface circuit receives the image information from the terminal device via a wireless device.

11. The display device according to claim 9, further comprising
an image processing circuit trimming and enlarging the image information when it is determined that the display unit is in the state of displaying the vertically oriented image.

12. The display device according to claim 9, further comprising
an acceleration sensor or an angular velocity sensor wherein
the determination unit determines whether the display unit is in the state of displaying the horizontally oriented image or in the state of displaying the vertically oriented image is determined, based on a result of detection by the acceleration sensor or the angular velocity sensor.

13. The display device according to claim 9, wherein
the determination unit determines whether the display unit is in the state of displaying the horizontally oriented image or in the state of displaying a vertically oriented image is determined, based on setting information about an arrangement of the display device.

14. A display system comprising:
a display unit displaying a horizontally oriented image or a vertically oriented image based on image information;
a storage unit storing first resolution information representing a first resolution and second resolution information representing a second resolution higher than the first resolution;
a determination unit determining whether the display unit is in a state of displaying the horizontally oriented image or in a state of displaying the vertically oriented image; and
an interface circuit transmitting the first resolution information to a terminal device when it is determined that the display unit is in the state of displaying the horizontally oriented image, transmitting the second resolution information to the terminal device when it is determined that the display unit is in the state of displaying the vertically oriented image, and receiving the image information with a resolution based on the first resolution information or the second resolution information from the terminal device.

* * * * *